United States Patent
Nolle et al.

(10) Patent No.: US 9,300,489 B1
(45) Date of Patent: Mar. 29, 2016

(54) CHANNEL ASSIGNMENT BASED ON SUBSCRIBED SERVICE LEVEL

(75) Inventors: Steven Paul Nolle, Naperville, IL (US);
Timothy Moore, Naperville, IL (US);
James Touhey, Naperville, IL (US);
Gregory Gohman, Beaverton, OR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 704 days.

(21) Appl. No.: 13/209,021

(22) Filed: Aug. 12, 2011

Related U.S. Application Data

(60) Provisional application No. 61/373,130, filed on Aug. 12, 2010.

(51) Int. Cl.
*H04L 12/26* (2006.01)
*H04L 12/54* (2013.01)

(52) U.S. Cl.
CPC ...................................... *H04L 12/56* (2013.01)

(58) Field of Classification Search
None
See application file for complete search history.

(56) References Cited

U.S. PATENT DOCUMENTS

| | | | |
|---|---|---|---|
| 7,113,484 B1 * | 9/2006 | Chapman et al. | 370/252 |
| 7,499,453 B2 * | 3/2009 | Carlson et al. | 370/395.2 |
| 2002/0126699 A1 * | 9/2002 | Cloonan et al. | 370/468 |
| 2007/0107023 A1 * | 5/2007 | Versteeg et al. | 725/95 |

* cited by examiner

*Primary Examiner* — Dang Ton
*Assistant Examiner* — Ronald h Davis
(74) *Attorney, Agent, or Firm* — Troy A. Van Aacken

(57) ABSTRACT

Systems and methods can be operable to provide subscription service level based channel assignment for network devices. In some implementations, such systems and methods can operate to create service flow list for use in assigning channels to CPE devices (e.g., modems, eMTAs, STBs, etc.). Such systems and methods can assist in assigning CPE devices to channels that correspond to their subscribed service level, thereby facilitating delivery of the proper level of service.

18 Claims, 5 Drawing Sheets

CHANNEL ASSIGNMENT BASED ON SUBSCRIBED SERVICE LEVEL

TECHNICAL FIELD

This disclosure relates to assigning modems to upstream channels based on a subscribed service level.

BACKGROUND

The Data-Over-Cable Service Interface Specification (DOCSIS) was established by cable television network operators to facilitate transporting data packets, primarily internet packets, over existing community antenna television (CATV) networks. In addition to transporting data packets, as well as television content signals over a CATV network, multiple services operators (MSO) also use their CATV network infrastructure for carrying voice, video on demand (VoD) and video conferencing packet signals, among other types.

Broadband services can be delivered via existing cable infrastructure from MSOs, digital subscriber lines (xDSL), integrated service digital network (ISDN), public switched phone networks, or T1 connections from telecommunications operators or internet service providers, satellite from satellite operators, or wireless services (such as, e.g., cellular, 802.11 or Wi-MAX standards) from wireless service providers, among many others. The growth of broadband customer premise equipment (CPE) devices such as, for example, cable modems (CMs) and multimedia terminal adapters (MTAs) has expanded traditional data services to provide additional functionality such as, for example, voice over internet protocol (VoIP) telephony service in a single integrated device.

In an effort to balance the downstream and upstream channels from a cable modem termination system (CMTS), CMs/MTAs can be directed to change from heavier loaded channels to lighter loaded channels. CMs/MTAs can be moved to other channels following an initial range request following the registration process or during normal operations. However, some subscribers may never achieve their full subscribed upstream or downstream bandwidth based upon the details of the registration process and subsequent channel assignment.

DETAILED DESCRIPTION

In some implementations of this disclosure, systems and methods can operate to allocate CPE devices to channels based on subscribed service levels. In some implementations, upon registration of a CPE device with a CMTS, the CMTS can check subscribed service level for a device against a current upstream channel on which the device is attempting to register. In some implementations, if the device has subscribed to a higher service level than is available on the current upstream channel, the CMTS can register the device on the current channel and send a dynamic channel change (DCC) request to the device to switch to another channel capable of supporting the subscribed service level. In other implementations, the CMTS can instruct the cable modem to register on another channel capable of supporting the subscribed service level. In other implementations, the CMTS can periodically audit the load balance groups to determine whether a CPE device on a particular upstream channel has a subscription service level that is beyond the ability of the channel to support.

In some implementations, the subscription service level can be derived by adding up a $T_{max}$ (e.g., maximum bandwidth) value associated with each of the service flows the device has active on the channel. If the $T_{max}$ value exceeds the total bandwidth of the channel, the CPE device can be instructed to move to another channel which can accommodate the maximum bandwidth of the service flows associated with the device. For example, if a cable modem registers with three service flows, a voice service flow of 1 Mbps and a data service flow of 16 Mbps on a legacy 7 Mbps upstream channel, the CMTS can instruct the cable modem to move to higher bandwidth asynchronous time division multiple access (A-TDMA) or synchronous code division multiple access (S-CDMA) channel.

Figure 1:
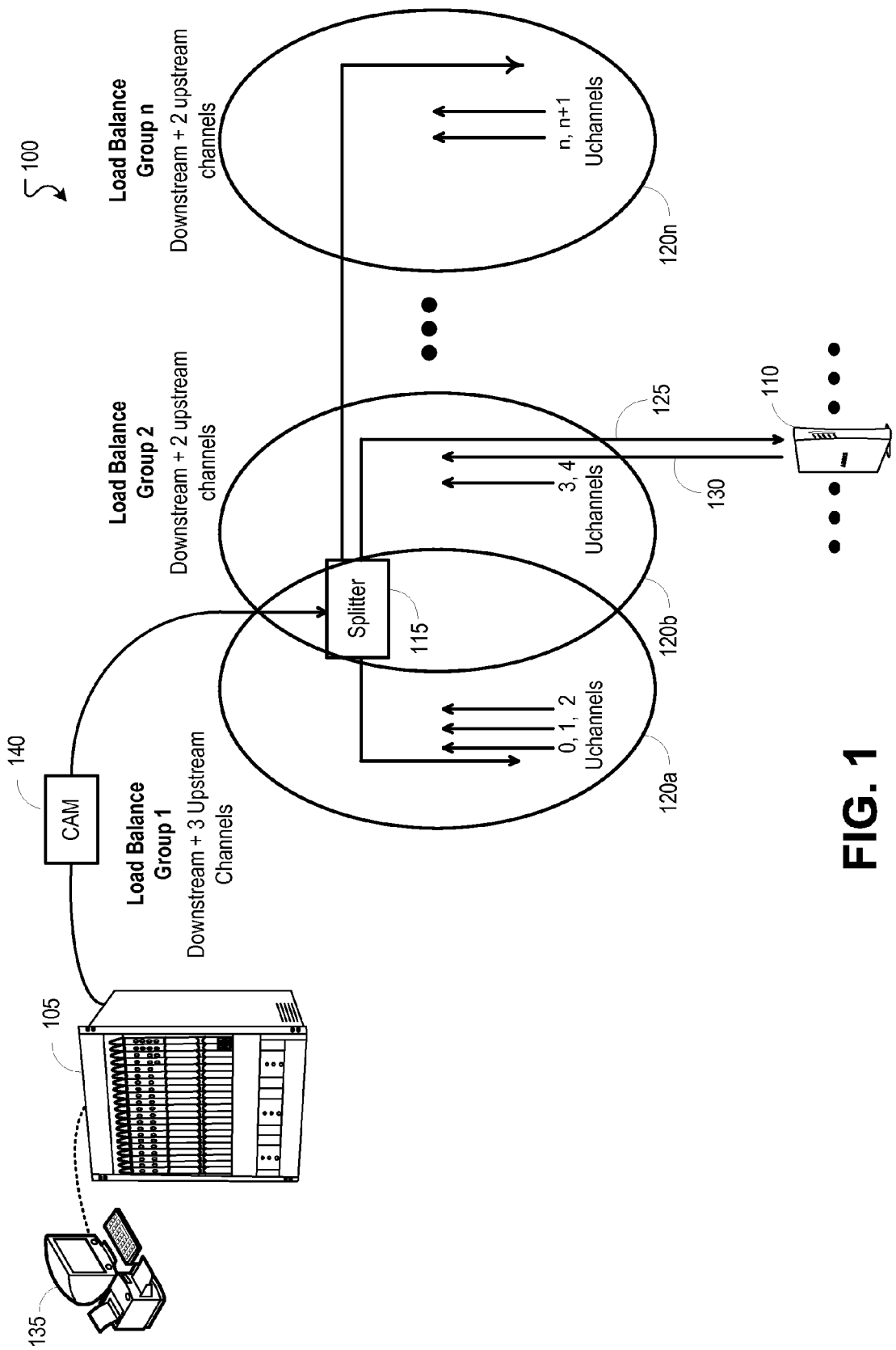
FIG. 1 is a block diagram illustrating an example network environment operable to provide subscription service level based channel assignment for network devices.

FIG. 1 is a block diagram illustrating an example network environment operable to provide improved load balancing for network devices. In some implementations, a CMTS 105 can provide video, data, and/or voice service(s) to users at the CM/MTA 110. The CMTS can attach to one or more devices to distribute signals and load balancing information such as, for example, a splitter 115. The splitter 115 can further segment into multiple load groups 120a, 120b . . . n such as, for example, Group 1 120a, Group 2 120b, Group N 120n. An individual load group 120a-b can include one or more downstream channels 125 and/or upstream channels 130. The downstream channels 125 can provide video, data, and/or voice service(s) from the CMTS 105 to users at the CM/MTA 110. The upstream channels 130 can provide video, data, and/or voice service(s) from the users at the CM/MTA 110 to the CMTS 105. Moreover, a computing device 135 can be used to store and/or manage load balancing data or subscriber service level data. It should be understood that a computing device 135 can be an optional component to implement improved cable model load balancing.

The CMTS 105 and/or a computing device 135 connected to the CMTS can perform load balancing for network devices by assigning CM/MTA 110 to downstream 125 and/or upstream 130 channels to optimize performance. For example, if the downstream channels in Group 1 120a are operating at maximum capacity while downstream channels in Group 2 120b are operating in at a low capacity, then load balancing for network devices can reassign one or more CM/MTA 110 in one channel in Group 1 120a to a channel in Group 2 120b. The reassignment of a CM/MTA 110 can sometimes result in a failure of a specific CM/MTA 110 to move channel groups thereby resulting in an interruption of service to the user. Moreover, if the failure results in a low-load channel, the selected channel might be more likely to be chosen for additional channel assignments thereby exacerbating the problem of load balancing and reducing optimal service.

The CMTS 105 and/or computing device 135 can also assign subscriber devices to particular channels based upon their service level subscription. For example, if a CPE device 110 with a high service level attempts to register on a legacy time division multiple access (TDMA) channel, the CMTS 105 and/or computing device 135 can instruct the CPE device 110 to move to or register on a newer ATDMA or SCDMA channel. Similarly, in some implementations, if a CPE device 110 with a low subscription service level registers on a high bandwidth channel (e.g., ATDMA or SCDMA), that CPE device 110 can be instructed to move to a lower bandwidth channel (e.g., legacy TDMA channel).

The channel assignment for network devices based on subscription service level can be implemented at the CMTS 105 and/or a computing device 135 communicating with the CMTS 105. The channel assignment based upon subscription service level can manage a service flow list for each device. In some implementations, all or part of the subscription service level based channel assignment for network devices can be performed in a cable access module (CAM) 140. In other implementations, all or part of the subscription service level based channel assignment for network devices can be performed in another part of the CMTS 105. In still further implementations, all or part of the subscription service level based channel assignment for network devices can be performed in another computing device 135 attached to the CMTS 105. However, it should be understood that the computing device 135 is not necessary to implement subscription service level based channel assignment for network devices, but can be used for administration.

Figure 2:
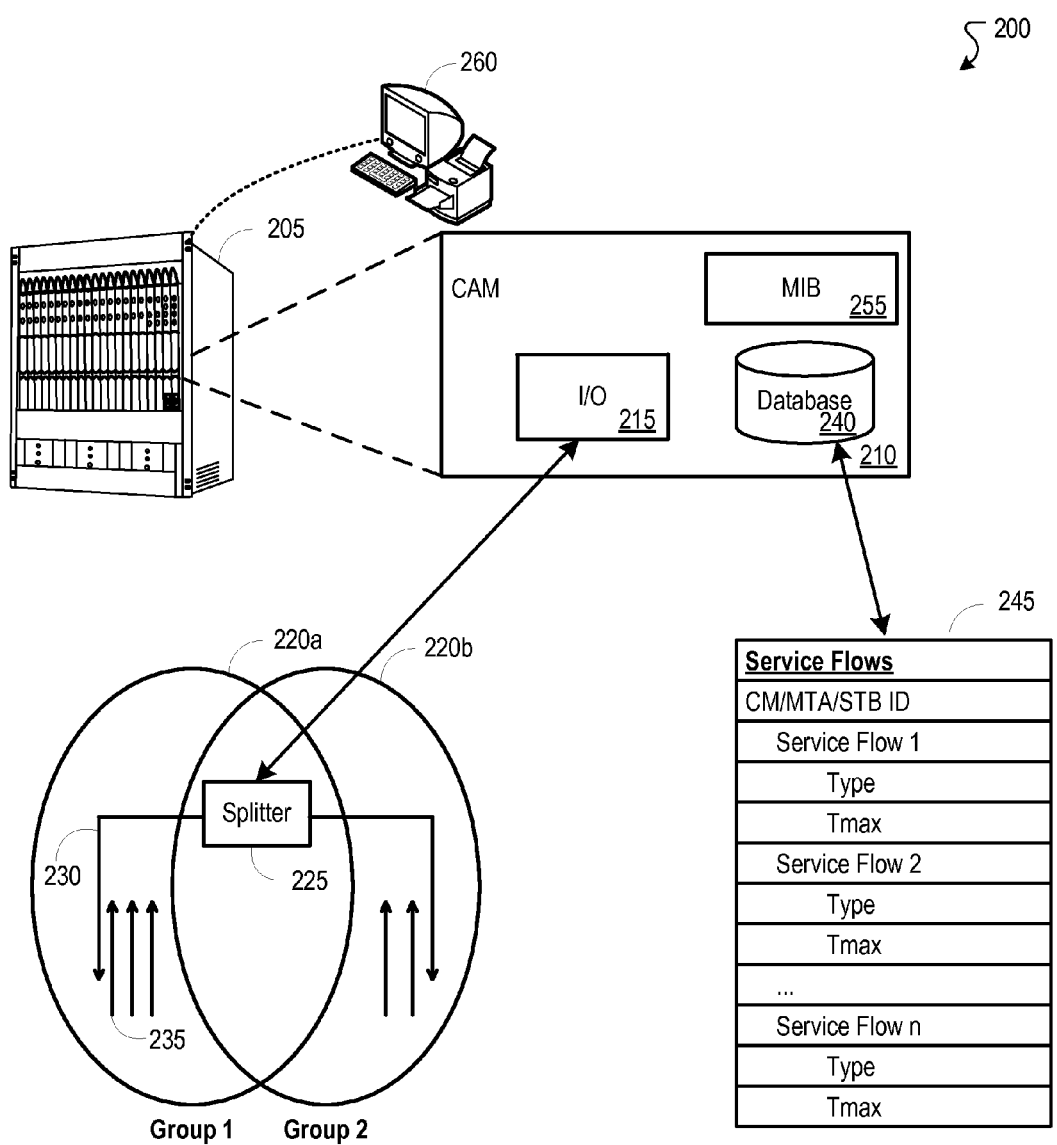
FIG. 2 is a block diagram illustrating an example CMTS device operable to provide subscription service level based channel assignment for network devices.

FIG. 2 is a block diagram illustrating an example CMTS device operable to provide subscription based channel assignment for network devices. The CMTS 205 can include a CAM 210 operable to provide subscription service level based channel assignment. The CAM 210 can store, process, and/or communicate instructions to implement subscription service level based channel assignment. The CAM 210 can include an I/O module 215 that communicates with load balance groups 220a-b through a splitter 225. The splitter can distribute and receive content on downstream channels 230 and upstream channels 235 to and from end users at a CPE device (e.g., CM/MTA 110 of FIG. 1).

The CAM 210 can also include a database 240 operable to store and retrieve a service flow list 245. The service flow list 245 can operate to implement subscription service level based channel assignment for network devices by storing network/device characteristics such as, for example, a CM/MTA/STB ID, service flow(s) associated with the CM/MTA/STB ID, type of service flow, bandwidth maximum (e.g., $T_{max}$) for each service, among others characteristics. In some implementations, the service flow list 245 can be a text file comprised of ASCII text characters. In other implementations, the service flow list 245 can be another file format that represents respective network/device characteristics.

The CAM 210 can also include one or more management information base (MIB) objects 255 to record and store network/device characteristics operable to implement improved load balancing for network devices. The MIB object(s) 255 can operate to implement subscription service level based channel assignment for network devices by storing network/device characteristics such as, for example, a CM/MTA ID, a channel source, a channel destination, a class, a timestamp, an exclude-threshold count, CPE device type/abilities, among other elements. In some implementations, the MIB object(s) 255 can be used in conjunction with the service flow list 245 to implement subscription service level based channel assignment for network devices. For example, the MIB object(s) 255 can store device characteristics and the service flow list 245 can store network characteristics. It should be understood that other processing, computing, and/or storage elements can be present in the CAM 210 and/or the CMTS 205 to implement subscription service level based channel assignment.

In addition, a computing device 260 can be connected to the CMTS 205. The computing device 260 can be used as a replacement for (or in conjunction with) the CAM 210 to implement subscription service level based channel assignment for network devices. It should be understood that the computing device 260 is not necessary for subscription service level based channel assignment for network devices. The computing device 260 can store, process, and/or communicate instructions to implement improved subscription service level based channel assignment.

Figure 3:
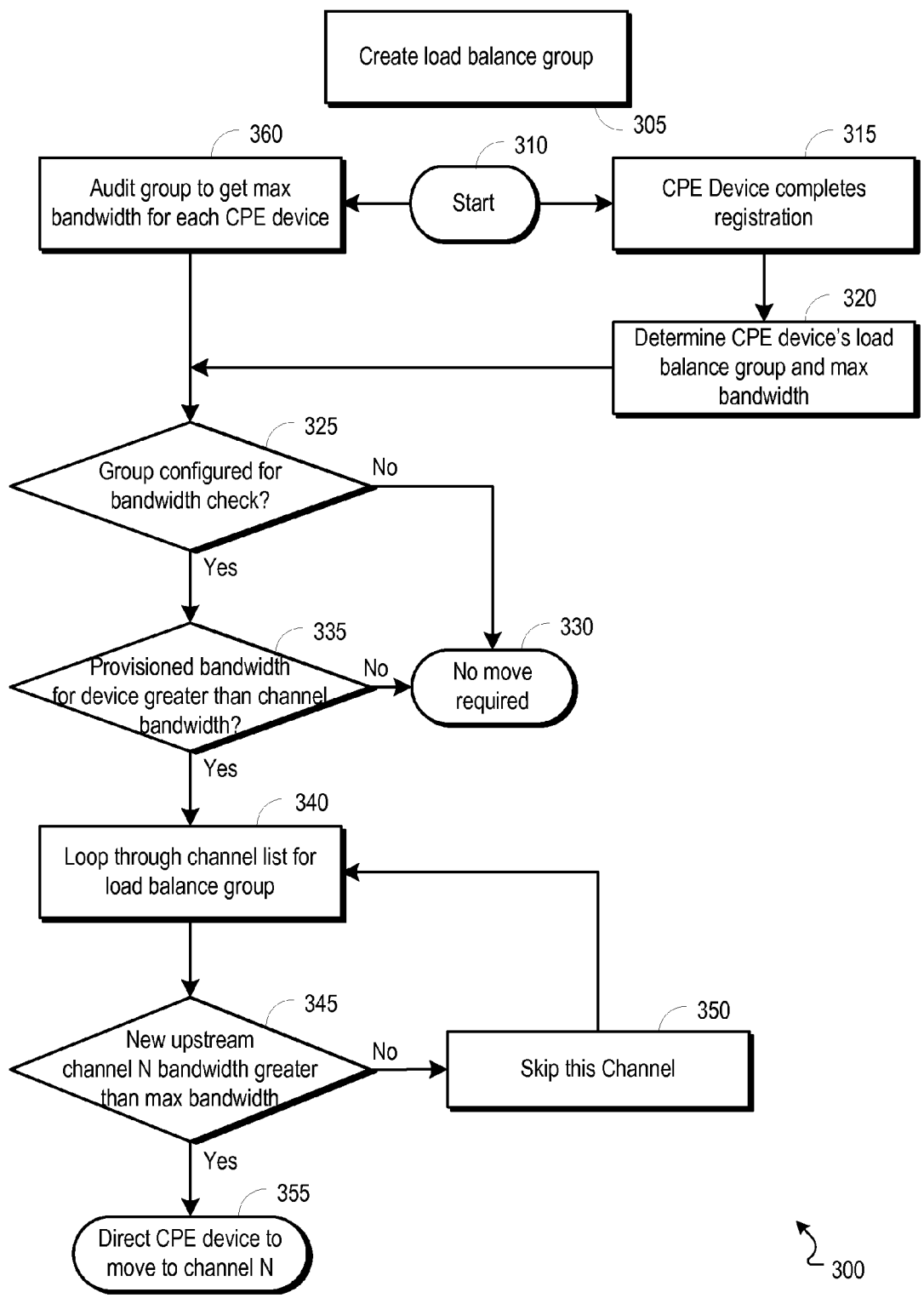
FIG. 3 is a flowchart illustrating an example process operable to provide subscription service level based channel assignment for network devices.

FIG. 3 is a flowchart illustrating an example process 300 operable to provide subscription service level based channel assignment for network devices. In some implementations, the process 300 can initialize at stage 305 when a CPE device can be assigned to a load balance group following registration. The load balancing group can be assigned, for example, by a CMTS (e.g., CMTS 205 of FIG. 2) or a CAM (e.g., CAM 210 of FIG. 2). However, it should be understood that the load balance groupings are not necessary to practice this disclosure. The load balance groups provide a convenient grouping through which to cycle for auditing purposes.

The process 300 begins at stage 310. At stage 315 the CPE device completes registration. The CPE device can complete registration based upon performing a registration process with a CMTS (e.g., CMTS 205 of FIG. 2) specified by any of the DOCSIS standards (e.g., DOCSIS 1.x, 2.0, 3.0).

At stage 320, the CPE device's load balance group and maximum bandwidth is determined. The CPE device's load balance group and maximum bandwidth can be determined, for example, by a CMTS device (e.g., CMTS 205 of FIG. 2) or a CAM (e.g., CAM 210 of FIG. 2). In some implementations, the CMTS or CAM can query the device to determine its service level. In other implementations, the CMTS or CAM can receive a configuration file that defines the device's subscribed service level. In still further implementations, the CMTS or CAM can identify the service flows opened by the CPE device to identify the maximum bandwidth of the device.

At stage 325, a determination whether the load balancing group is configured for bandwidth check is made. The determination of whether the load balance group is configured for bandwidth check can be made, for example, by the CMTS device (e.g., CMTS 205 of FIG. 2) or the CAM (e.g., CAM 210 of FIG. 2). In some implementations, the determination of whether the load balance group is configured for bandwidth check is optional. Thus, an administrator can choose whether or not to implement the subscription service level based channel assignment for a particular load balance grouping. In other implementations, all of the load balance groupings are subject to service level based channel assignment. In still further implementations, some other grouping can be used to implement the subscription service level based channel assignment. If the load balance group is not configured for the bandwidth check, the process ends at stage 330, with no move required.

However, if the load balance group is configured for the bandwidth check, the process 300 proceeds to stage 335, where a determination is made whether the provisioned bandwidth is greater than the channel bandwidth. The determination of whether the provisioned bandwidth is greater than the channel bandwidth can be made, for example, by a CMTS device (e.g., CMTS 205 of FIG. 2) or a CAM device (e.g., CAM 210 of FIG. 2). If it is determined that the provisioned bandwidth is not greater than the channel bandwidth, the process 300 ends at stage 330 with no move required.

If the determination is made that the provisioned bandwidth is greater than the channel bandwidth, the process 300 proceeds to stage 340 where the process 300 loops through the channel list for the load balance group. The loop through the load balance group can be made, for example, by a CMTS device (e.g., CMTS device 205 of FIG. 2) or a CAM (e.g., CAM 210 of FIG. 2). In some implementations, the loop through the load balance group is made to identify channels that have higher bandwidth than the max bandwidth provisioned for the CPE device.

At stage 345, a determination is made whether a new upstream channel (N) has a bandwidth greater than the maximum provisioned bandwidth for the CPE device. The determination can be made, for example, by a CMTS (e.g., CMTS 205 of FIG. 2) or a CAM (e.g., CAM 210 of FIG. 2). If the bandwidth for channel N is not greater than the maximum provisioned bandwidth for the device, then the process proceeds to stage 350, where channel N is skipped, and the process 300 returns to stage 340 to identify the next channel in the load balance group.

Upon finding a downstream channel that has a bandwidth greater than the maximum provisioned bandwidth of the CPE device, at stage 355, the CPE device can be directed to move the channel with bandwidth greater than the maximum provisioned bandwidth of the CPE device. The CPE device can be directed to move to the new channel, for example, by a CMTS device (e.g., CMTS device 205 of FIG. 2) or a CAM (e.g., CAM 210 of FIG. 2).

In those implementations where the CPE device is already running and assigned to a load balancing group, the process 300 can move to stage 360 after stage 310 and audit the load balance group to get the maximum bandwidth for each CPE device in the load balance group. The audit can be performed, for example, by a CMTS device (e.g., CMTS device 205 of FIG. 2) or a CAM (e.g., CAM 210 of FIG. 2). After the maximum bandwidth for each of the devices in the load balance group is obtained, the process can proceed similarly to the initial CPE process described above. Thus, if the load balance group is configured for a bandwidth check, each of the devices' maximum provisioned bandwidth can be compared to a respective channels' bandwidth. If there are any devices that have a maximum provisioned bandwidth that is greater than the channel bandwidth, a search for a channel with a large enough bandwidth can be made within the load balance group, and the device can be instructed to move to a channel with a larger bandwidth.

In those instances where there is no channel that has a bandwidth that is larger than the provisioned maximum bandwidth of the device, in some implementations, the device can be moved to the channel with the largest bandwidth within that load balance group. In other implementations, the device can be moved to another load balance group that has a channel with sufficient bandwidth to handle the maximum provisioned bandwidth for the device. In still further implementations, the device can be left on the channel it is currently using.

Figure 4:
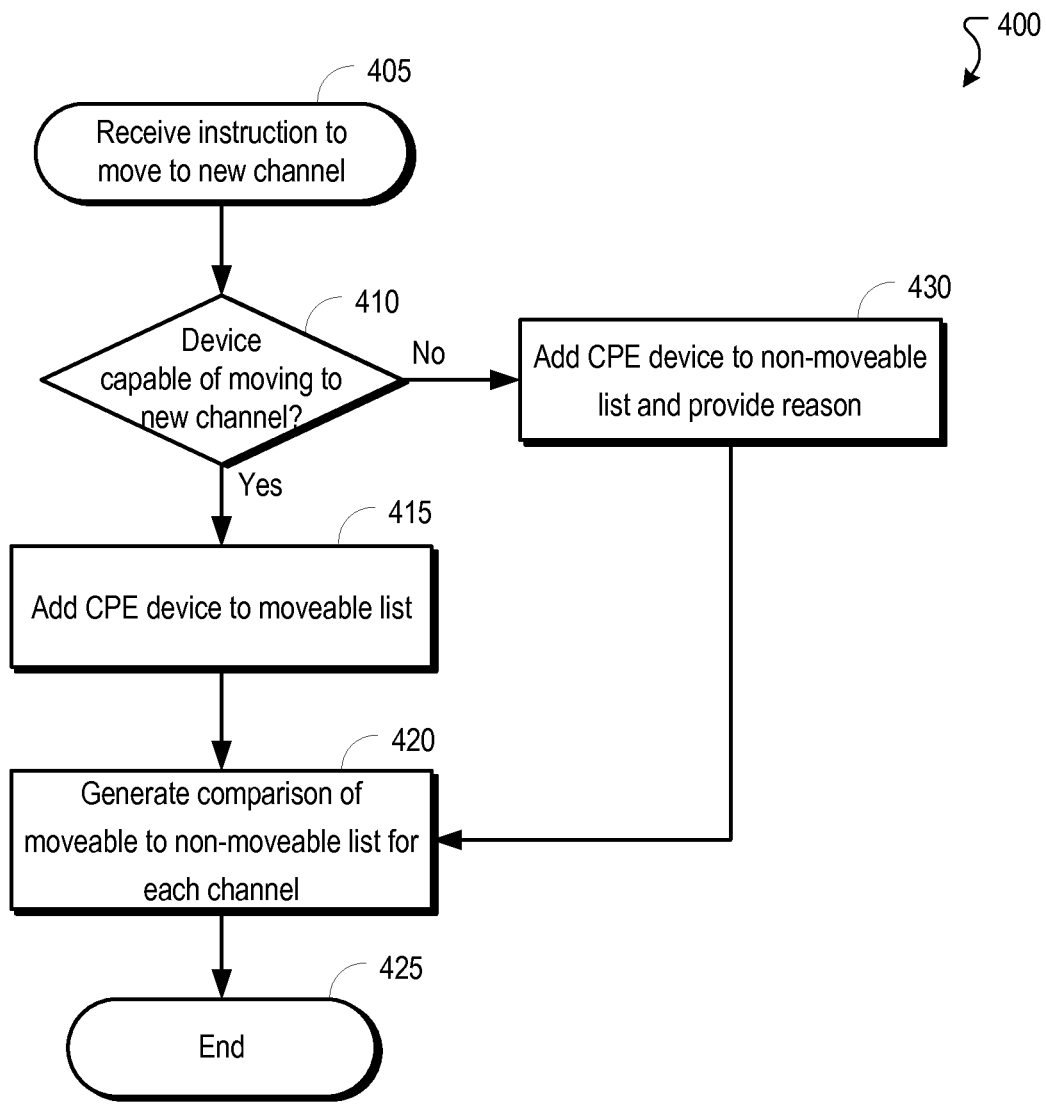
FIG. 4 is a flowchart illustrating an example process operable to provide subscription service level based channel assignment for network devices.

FIG. 4 is a flowchart illustrating an example process 400 operable to provide subscription service level based channel assignment for network devices. The process 400 begins at stage 405 where instructions have been received by a CPE device to move to a new channel. In some implementations, the instructions to move to a new channel can be received responsive to a determination that the subscription service level of the device has a larger bandwidth than can be provided by the channel currently being used by the device.

At stage 410, a determination is made whether the device is capable of moving to the instructed channel. The determination can be made, for example, by the CPE (e.g., CPE device 110 of FIG. 1) responsive to receiving the channel change instruction. In some implementations, the determination is made after the CPE device attempts ranging and registration on the new channel.

If the device is capable of moving to the new channel, at stage 415, the CPE device can be added to a moveable list. The device can be added to the moveable list, for example, by a CMTS (e.g., CMTS 205 of FIG. 2) or a CAM (e.g., CAM 210 of FIG. 2). The moveable list can aid the CMTS or CAM in determining which devices can be moved during a load balancing operation, and which devices cannot be moved during a load balancing operation.

At stage 420, a comparison of the moveable list to a non-moveable list can be made. The comparison can be made, for example, by a CMTS device (e.g., CMTS 205 of FIG. 2) or a CAM (e.g., CAM 210 of FIG. 2). In some implementations the comparison of the moveable list to the non-moveable list can facilitate which load balancing groups should be adjusted. The process ends at stage 425.

If either of the ranging and registration processes are not successful after one or more attempts, at stage 430, the CPE device can be added to a non-moveable list and a reason why the device cannot be moved is recorded for use in the comparison stage 420. The addition of the device to the non-moveable list and the recording of the reason can be performed, for example, by a CMTS device (e.g., CMTS device 205 of FIG. 2) or a CAM (e.g., CAM 210 of FIG. 2). In some implementations, recording the reason why a CPE device cannot be moved can help an administrator analyze why load balancing groups may not be arranged optimally and potentially allow the administrator to correct problems with the network that prevent the device from being moved to another channel.

Figure 5:
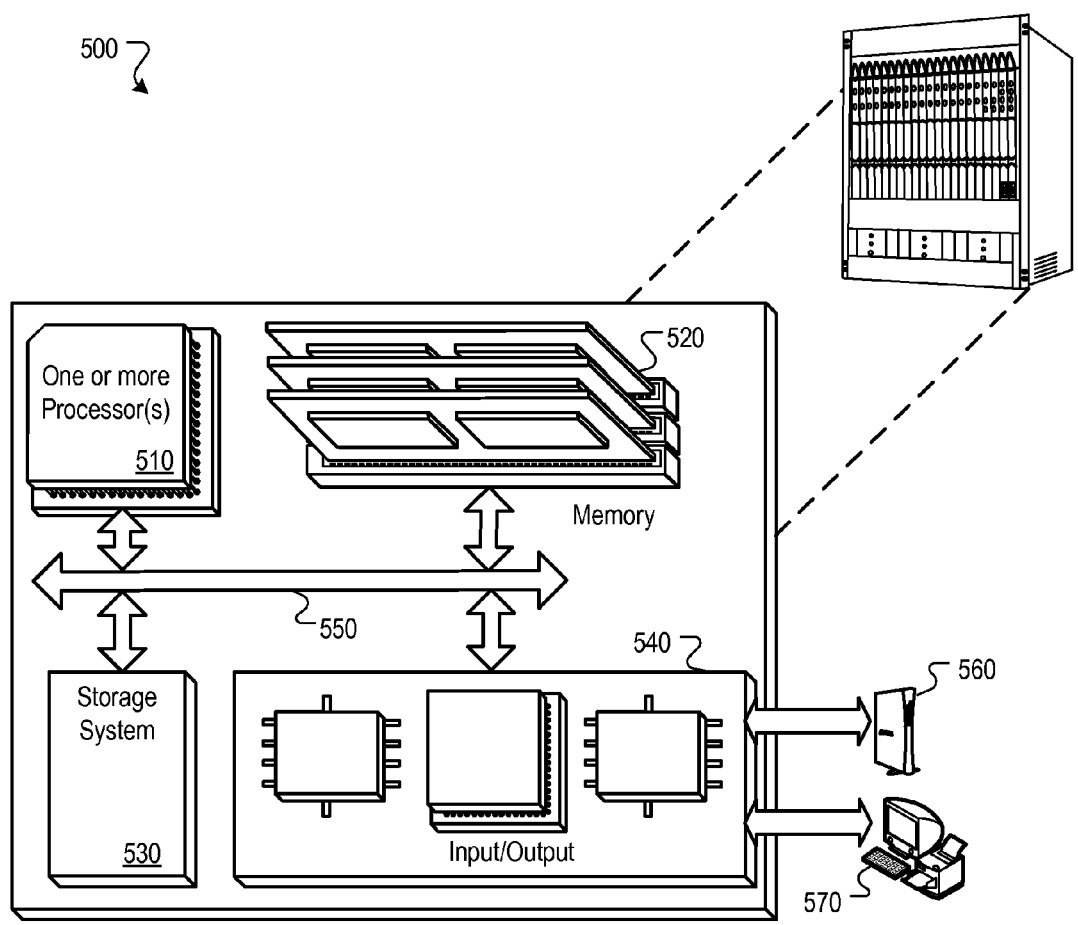
FIG. 5 is a block diagram of a CMTS device operable to provide subscription service level based channel assignment for network devices.

FIG. 5 is a block diagram of a CMTS device (e.g., CMTS 105 of FIG. 1 and CMTS 205 of FIG. 2) operable to provide subscription service level based channel assignment. The subscription service level based channel assignment for network devices CMTS device 500 can include one or more processors 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the device 500. In one implementation, the memory 520 is a computer-readable medium. In one implementation, the memory 520 is a volatile memory unit. In another implementation, the memory 520 is a non-volatile memory unit.

In some implementations, the storage device 530 is capable of providing mass storage for the device 500. In one implementation, the storage device 530 is a computer-readable medium. In various different implementations, the storage device 530 can include, for example, a hard disk device, an optical disk device, flash memory or some other large capacity storage device.

The input/output device 540 provides input/output operations for the device 500. In one implementation, the input/ output device 540 can include one or more of a wireless interface and various networks and devices 560. In addition, such input/output device 540 can communicate with other external devices 570 through interfaces such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices (e.g., various networks and devices 860 such as, for example, CM/MTA, computing device, among many others), as well as sending communications to, and receiving communications from various networks (not shown).

The device 500 (e.g., a CMTS device) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMA-Script instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a phone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A method comprising:
   determining a subscription service level for a customer premise equipment device active on a first channel;
   determining an actual bandwidth on the first channel;
   comparing the actual first channel bandwidth with the subscription service level;
   directing the device to move to a second channel in response to determining the actual first channel bandwidth is lower than the subscription service level; and
   wherein determining the subscription service level comprises summing a maximum bandwidth value associated with a plurality of service flows the device has active on the first channel.

2. The method of claim 1, wherein the actual first channel bandwidth is deemed inappropriate if the subscription service level is greater than the actual first channel bandwidth.

3. The method of claim 1, wherein the second channel is determined to have sufficient available bandwidth to accommodate the subscription service level before the second channel is selected.

4. The method of claim 1, wherein the second channel is determined to have more bandwidth for accommodating the subscription service level than the first channel before the second channel is selected.

5. A system comprising:
   a cable modem termination system processor operable to to determine a subscription service level for a customer premise equipment device active on a first channel;
   the cable modem termination system processor being further operable to determine an actual bandwidth usage on the first channel;
   the cable modem termination system processor comparing the actual first channel bandwidth with the subscription service level and directing
   the customer premise equipment device to move to a second channel in response to determining the actual first channel bandwidth is less than the subscription service level; and
   wherein determining the subscription service level comprises summing a maximum bandwidth value associated with a plurality of service flows the device has active on the first channel.

6. The system of claim 5, wherein the cable modem termination system comprises one or more a conditional access module devices.

7. The system of claim 5, wherein the actual first channel bandwidth is deemed inappropriate if the subscription service level is greater than the actual first channel bandwidth.

8. The system of claim 5, wherein the second channel is determined to have sufficient available bandwidth to handle the subscription service level before the second channel is selected.

9. The system of claim 5, wherein the second channel is determined to have more available bandwidth to handle the subscription service level than the first channel before the second channel is selected.

10. A system comprising:
    means for determining a subscription service level for a customer premise equipment device active on a first channel;
    means for determining an actual bandwidth on the first channel;
    means for comparing the actual first channel bandwidth with the subscription service level;
    means for directing the device to move to a second channel in response to determining the actual first channel bandwidth is less than the subscription service level; and
    wherein the means for determining the subscription service level comprises summing a maximum bandwidth value associated with a plurality of service flows the device has active on the first channel.

11. The system of claim 10, wherein the actual first channel bandwidth is deemed inappropriate if the subscription service level is greater than the actual first channel bandwidth.

12. The system of claim 10, wherein determining the subscription service level comprises summing a maximum bandwidth value associated with a plurality of service flows the device has active on the first channel.

13. The system of claim 10, wherein the second channel is determined to have sufficient available bandwidth to accommodate the subscription service level before the second channel is selected.

14. The system of claim 10, wherein the second channel is determined to have more available bandwidth to accommodate the subscription service level than the first channel before the second channel is selected.

15. One or more non-transitory computer-readable media having instructions stored thereon, the one or more computer-readable media, when executed by a processor, causing the processor to perform operations comprising:
    determining a subscription service level for a customer premise equipment device active on a first channel;
    determining an actual bandwidth on the first channel;
    comparing the actual first channel bandwidth with a bandwidth associated with the subscription service level;
    directing the device to move to a second channel in response to determining the actual first channel bandwidth is less than the bandwidth associated with the subscription service level; and
    wherein determining the subscription service level comprises summing a maximum bandwidth value associated with a plurality of service flows the device has active on the first channel.

16. The one or more computer-readable media of claim 15, wherein the actual first channel bandwidth is deemed inappropriate if the subscription service level is greater than the actual first channel bandwidth.

17. The one or more computer-readable media of claim 15, wherein the second channel is determined to have sufficient bandwidth to accommodate the subscription service level before the second channel is selected.

18. The one or more computer-readable media of claim 15, wherein the second channel is determined to have more sufficient bandwidth to accommodate the subscription service level than the first channel before the second channel is selected.

* * * * *